(No Model.)
J. B. HUSTED.
NAIL MACHINE.
No. 291,058.  Patented Jan. 1, 1884.
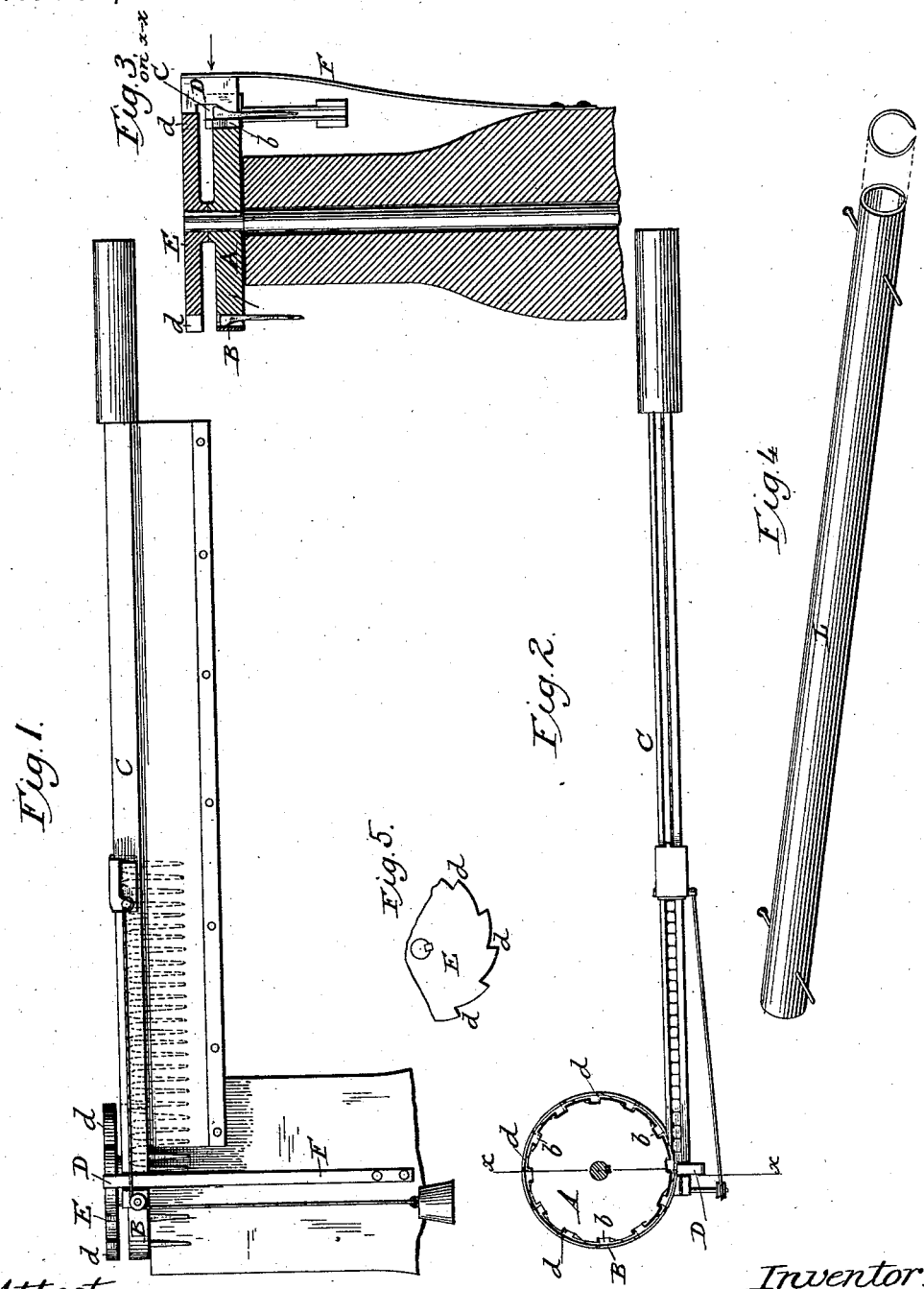
Attest.
Sidney P. Hollingsworth
Newton Wyckoff
Inventor.
J. B. Husted
By his Attorney
Philip T. Dodge

UNITED STATES PATENT OFFICE.

JETHRO B. HUSTED, OF VERGENNES, VERMONT.

NAIL-MACHINE.

SPECIFICATION forming part of Letters Patent No. 291,058, dated January 1, 1884.

Application filed July 20, 1883. (No model.)

*To all whom it may concern:*

Be it known that I, JETHRO B. HUSTED, of Vergennes, in the county of Addison and State of Vermont, have invented certain Improvements in Nail-Machines, of which the following is a specification.

The aim of this invention is to avoid the hand-labor commonly employed for the purpose of feeding machines used in pointing horseshoe-nails.

To this end it consists in an automatic feeding device of peculiar construction, hereinafter explained.

The invention is designed more particularly as an improvement upon the feed mechanism represented in Letters Patent of the United States granted to me on the 8th day of October, 1878, No. 280,683. Said original patent represents a machine in which the nails, suspended by their heads in a slotted guide, are pushed forward by a slide in their rear and delivered successively to a rotating carrier-disk, the periphery of which is provided with notches or recesses to receive the heads of the individual nails. In my present machine I retain the carrying-disk notched at the periphery, and also the slotted guide to suspend the nails and deliver the same to the carrying-disk. Instead, however, of arranging the guide, as in the original machine, radially with respect to the carrying-disk, I now place the same in a position tangential to the disk and deliver the nails successively from the end of the guide transversely to its length into the recessed edge of the disk by means of a reciprocating dog or feeder. This dog may be operated by any suitable appliance; but I prefer, as the most simple arrangement, the employment of a spring to force the dog or carrier inward, and ratchet-teeth upon or at the side of the carrier-disk to force the dog outward, this being the arrangement represented in the accompanying drawings.

Referring to the accompanying drawings, Figure 1 represents a side elevation of the rotary carrying-disk or head, of ordinary form, combined with my improved feeding devices. Fig. 2 is a top plan view of the same, the ratchet-wheel for operating the dog being indicated in dotted lines to expose the parts thereunder. Fig. 3 is a vertical cross-section on the line *x x*. Fig. 4 is a perspective view of one of the tubes employed for retaining the nails and delivering the same to the guide of the machine; Fig. 5, a plan view of a portion of the ratchet-wheel.

Referring to the drawings, A represents a horizontal revolving carrying disk or wheel provided in its periphery with a series of notches or recesses, *b*, each adapted to receive and retain the head of a single nail, which will thus be suspended from the periphery of the disk.

B represents a fixed band or ring encircling the disk in close proximity to its periphery for the purpose of retaining the nails in position therein, these features being substantially identical with those in the original machine.

C represents a horizontal grooved or slotted guide, adapted, like that in the original machine, to receive the bodies or shanks of the nails and sustain them therein by means of their heads resting upon the upper edges. This guide is arranged in the present instance tangentially to the periphery of the carrying-disk A, terminating at such point that each nail, in passing from the end of the guide, is brought directly opposite one of the recesses in the periphery of the disk in order that it may be forced therein. For the purpose of effecting this lateral movement of the nail and delivering the same into the recess of the disk, I employ the vibrating or reciprocating dog D, arranged to move transversely against the end of the guide or carrier C in a radial direction with respect to the disk. The action of this dog is to take each nail as it is projected from the guide or tube, and force the same inward until its head is seated within the disk, after which the dog retreats and the disk turns forward to present the next recess opposite the dog. Upon the retreat of the dog the line of notches is advanced by the feeding device behind them and the next nail in the series delivered from the tube in position to be acted upon by the dog. The backward or outward motion of the dog is produced by means of a disk or wheel, E, arranged above and concentric with the carrying-disk A, and revolving therewith. This second disk being provided at the periphery with ratchet-teeth *d*, it serves to act upon the dog and force the same outward. The inward motion of the dog, after the passage of each tooth, is effected by means of a spring, F, attached to or acting at its upper end behind the dog, and secured permanently in position at its lower end to the main frame or other suitable support. I prefer in ordinary cases to arrange the dog-operating disk or wheel above the carrier-disk, as represented in the drawings, but it may be located thereunder, if preferred.

By the above-described mechanism the nails will be transferred positively and automatically one after another to the disk, in which they will be retained, as before stated, by the encircling rim or band. Owing to this action of the apparatus the attention of the operator is required at long intervals only, so that a single operator is enabled to properly attend and feed a dozen or more machines. In order, however, to increase the number of machines which may be attended by a single operator, I provide special means of retaining the nails in position preparatory to their delivery into the guides and of effecting their delivery thereto. The means for this purpose consist simply of a long tube—such as shown in Fig. 4—having in one side a longitudinal slot adapted to receive the bodies or shanks of the nails, which will be assorted and arranged therein by hand, the heads of the nails being suspended within the tube, while the shanks are pendent therefrom. This assortment and application of the nails may be performed by children or other unskilled labor.

To the end of the guide C, I attach a tubular slotted extension having an internal diameter suitable to admit the end of the tube L, so that when thus applied the series of nails may be readily forced endwise into the tube and delivered into the guide. To prevent the accidental escape of the nails from the tube in which they are retained until required, removable pins $d$ are inserted transversely through the end of the same. It is intended to provide these tubes in large numbers, in order that they may be filled with nails and retained in store until required for use.

The present invention is restricted to those matters and things which are hereinafter claimed, and as to all matters which may be described or shown, but which are not claimed, the right is reserved to make the same the subject of a separate application.

Having thus described my invention, what I claim is—

1. In a nail-finishing machine, a revolving disk provided with peripheral recesses to receive the heads of the nails, and a slotted guide terminating adjacent to the periphery of said disk, in combination with a dog or carrier arranged to reciprocate past the end of the tube to and from the disk, and means, substantially as described, for imparting motion to said dog, whereby the nails are transferred positively and individually from the guide to the recesses of the disk.

2. In combination with the peripherally-notched disk, the grooved or slotted guide terminating adjacent thereto, the dog or carrier arranged to reciprocate past the end of the guide, the toothed wheel to move said dog backward, and the spring applied to drive the same forward.

3. In combination with the notched disk and the slotted guide, the tube, the spring-supported dog at the end of said tube, and a toothed disk secured above and concentric with the notched disk, substantially as shown.

4. In combination with the slotted guide, adapted to sustain the nails by their heads, the slotted tubular extension at the end of said guide, and the detachable slotted tube whereby the series of nails may be supported and transferred to the guide.

5. The improved device for transferring nails to the feed mechanism of the nail-machine, consisting of a longitudinally-slotted tube provided at its end with removable pins or stops to retain the nails therein.

JETHRO B. HUSTED.

Witnesses:
J. H. LUCEA,
D. P. HARVEY.